Mar. 20, 1923.

T. P. HILTON.
BAG HOLDER.
FILED JUNE 4, 1921.

Inventor
Thomas P. Hilton,
By
Attorney

Mar. 20, 1923.
T. P. HILTON.
BAG HOLDER.
FILED JUNE 4, 1921.
1,449,285.
2 SHEETS—SHEET 2.
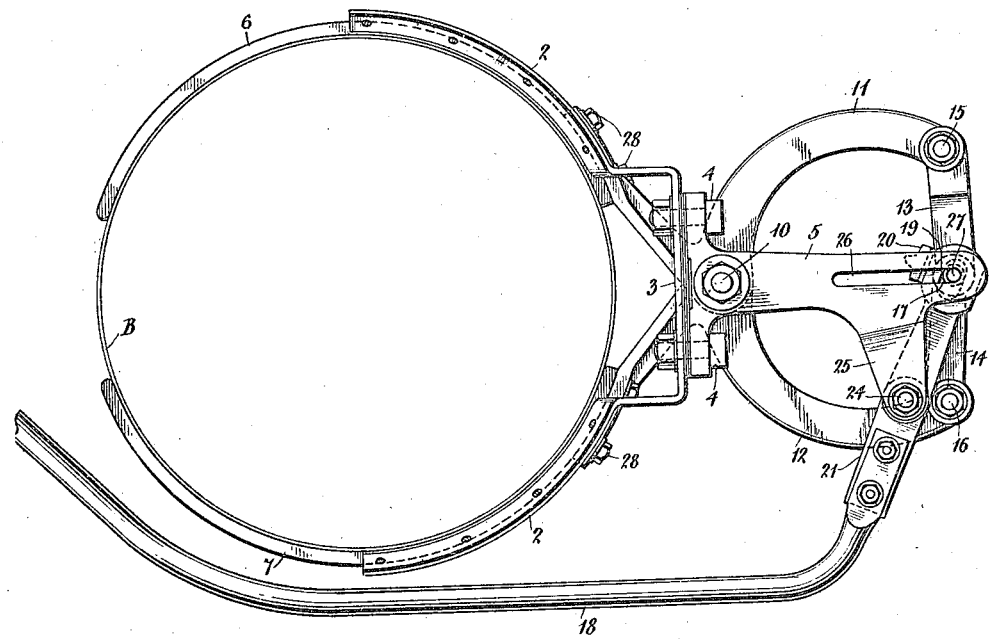
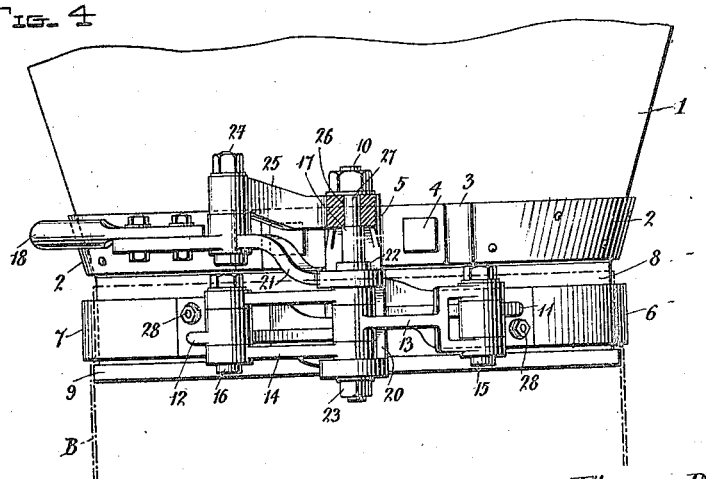
Inventor
Thomas P. Hilton,
By
Attorney Patented Mar. 20, 1923.

1,449,285

UNITED STATES PATENT OFFICE.

THOMAS P. HILTON, OF PATERSON, NEW JERSEY, ASSIGNOR TO RICHARDSON SCALE COMPANY, OF PASSAIC, NEW JERSEY, A CORPORATION OF NEW JERSEY.

BAG HOLDER.

Application filed June 4, 1921. Serial No. 475,074.

*To all whom it may concern:*

Be it known that I, THOMAS P. HILTON, a citizen of the United States, residing at Paterson, in the county of Passaic and State of New Jersey, have invented new and useful Improvements in Bag Holders, of which the following is a specification.

The present invention relates to improvements in bag holders of the kind adapted for use in connection with bag-filling machinery or apparatus. The primary object of the invention is to provide a novel and improved device of this character which is capable of manipulation quickly and with facility, to grip and release each bag, which enables the bag to be applied easily and quickly to a bag-filling spout or equivalent, and which operates automatically to lock itself when brought into action to hold the bag, whereby the bag is retained in position until the filling operation has been completed, wherein operation of the device to release the bag acts automatically to unlock the device, thus permitting quick and easy release and removal of the bag.

To these and other ends, the invention consists in certain improvements and combinations and arrangements of parts, all as will be hereinafter more fully described, the features of novelty being pointed out particularly in the claims at the end of the specification.

In the accompanying drawings:—

Figure 2 is a view similar to Figure 1, but showing the device in its locked or bag-holding position;

Figure 4 represents a rear elevation of the device as viewed from the right in Figure 2 but attached to the filling spout.

Similar parts are designated by the same reference characters in the several views.

Figure 1:
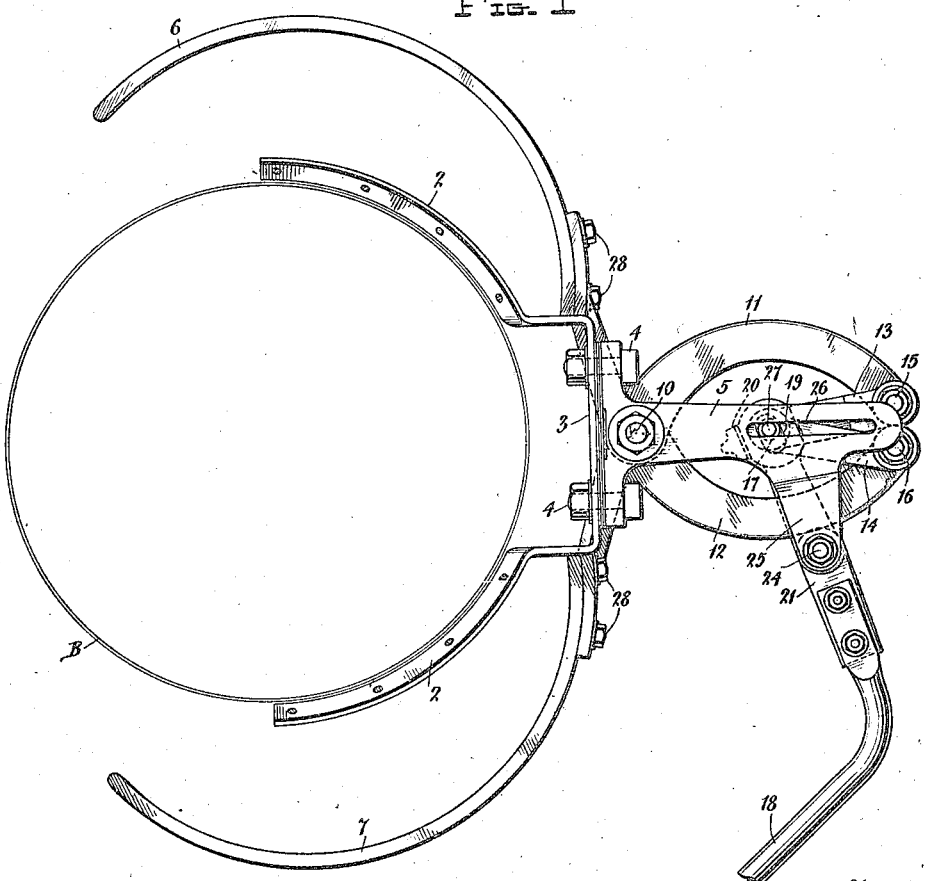
Figure 1 is a top plan view of a bag holder constructed in accordance with the preferred embodiment of the invention, the device being shown in its open or release position, and detached from the filling spout.
Figure 3:
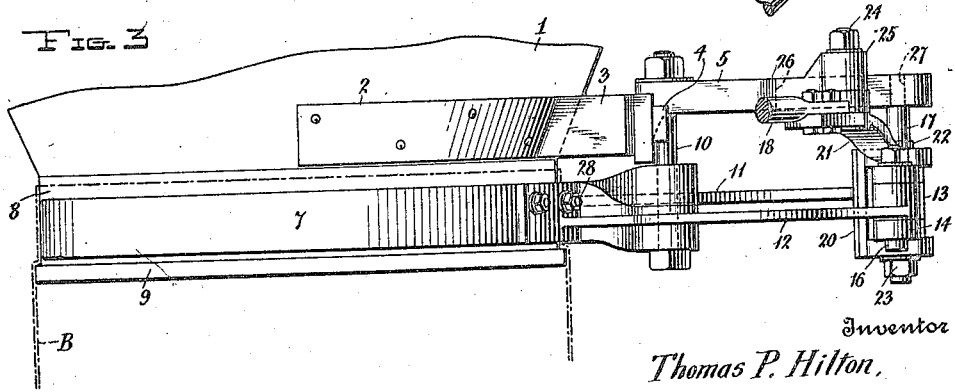
Figure 3 represents a side elevation of the device as shown in Figure 2 but attached to the filling spout.

Bag holders constructed in accordance with the present invention are applicable generally to all situations where it is desirable or necessary to hold a bag during filling thereof, it being particularly adapted for use in connection with a filling spout or equivalent apparatus around which the open mouth of the bag may be placed and through which spout grain or other material may flow from a bin, weighing machine, or other source of supply, into the bag. The preferred embodiment of the invention is shown in the accompanying drawings and will be hereinafter described in detail. It is to be understood, however, that the invention is not restricted to the precise construction shown, as equivalent constructions are contemplated and these will be included within the scope of the claims.

In the present instance, 1 represents the lower portion or outlet of a spout through which the material is supplied to the bags. This spout may lead from a bin or other source of supply or it may, for example, be supported to receive material discharged from a weighing machine or the like. This spout is preferably supported so that its lower or outlet end will be in a position to enter the mouth of a bag, when the latter occupies a bag-filling position, and in the preferred embodiment of the invention, the bag holder is attached to and thus positioned or supported by the spout. As shown, a pair of straps 2 are riveted or otherwise secured to the spout, at a point above its outlet end, and these straps are connected by an intermediate attaching portion 3. This attaching portion is secured by bolts 4 or by other suitable means, to a bracket 5, which latter preferably supports the operative mechanism of the bag holder.

The bag holder comprises a pair of segmental grippers 6 and 7, which are advantageously curved to conform with the curvature of the mouth or outlet of the spout. The spout is preferably formed at its mouth or outlet with a cylindrical portion 8, around the periphery of which the bag B is placed preparatory to the bag-holding operation, and to facilitate holding the bag on this cylindrical portion 8 of the spout, the lower edge of said portion may be provided with an outwardly-projecting circumferential flange 9 on its lower edge. The grippers 6 and 7 are movable toward one another to clamp and grip the mouth of a bag between them and the portion 8 of the spout, and they are movable in a direction away from one another to release a bag and to enable the mouth of another bag to be applied with facility over the mouth of the spout. As shown, the grippers 6 and 7 are pivoted to swing on a pin or bolt 10 which extends through the bracket 5, the gripper 6 having an operating arm 11 fixed to it beyond the pivot 10, while the gripper 7 has an operating arm 12 fixed to it beyond the pivot 10. The grippers are actuated in direction to grip and release a bag by mechanism which operates upon the arms 11 and 12. Preferably and as shown, a toggle mechanism is employed which is capable of actuating the grippers and is also capable of locking the grippers in bag-holding position. This toggle mechanism, as shown, comprises links 13 and 14, the outer ends of which are pivotally connected to the arms 11 and 12 by the pivots 15 and 16, and the inner ends of which are connected by a common pivot pin 17. This pivot pin 17 is preferably in the form of a bolt and it serves as a connection for an operating handle 18. For this purpose, the bolt 17 extends through a slot 19 which is formed in a yoke 20 on one end of an operating lever 21, this yoke having the inner ends of the links 13 and 14 located within it and the bolt 17 has a collar or shoulder 22 to rest on the upper arm of the yoke and a nut 23 to bear against the lower arm of the yoke. By this construction, the pivot or bolt 17 is held in operating relation to the lever 21, and the inner ends of the links 13 and 14 are free for pivotal movements. The operating lever 21 is pivoted on a pin or bolt 24 which is carried by an arm 25 leading off from one side of the bracket 5, and the operating handle 18 which is fixed to the operating lever 21 is preferably extended forwardly so that its free end is located within convenient reach of manipulation by the attendant, while occupying a position in front of the bag holder. The toggle links 13 and 14 are preferably so arranged and proportioned that the grippers 6 and 7 are forced inwardly and into gripping engagement with the mouth of the bag, by a straightening action of the toggle links, and also these toggle links are so proportioned and arranged that they will move slightly past their dead center position and will thus lock the grippers in bag-holding position. To limit the movement of the toggle links past their dead center position between the pivots 15 and 16, the bracket 5 is preferably formed with a guide or slot 26 in which the upper end 27 of the pivot or bolt 17 operates, the end of this slot acting as a limit stop which will restrict the flexing of the toggle links after they have passed the dead center position in the operation of gripping and holding the bag. The slot 26, acting in conjunction with the pivot pin or bolt 17, will also act as a guide which will equalize the grippers 6 and 7, thus insuring equal spacing of these grippers at opposite sides of the spout at all positions occupied by the grippers.

The grippers 6 and 7 are preferably fixed detachably to their respective arms 11 and 12, by screws or bolts 28, or other suitable means, in order that grippers of different radii may be used to conform with spouts of different diameters.

The mode of operation of the bag holder, as shown, is substantially as follows:—The bag to be filled is placed beneath the spout and the open mouth of the bag is applied to the outer periphery of the part 8 of the spout, while the operating handle 18 is swung rearwardly, as is shown in Figure 1. When the operating lever is in this position, the pivot pin 17 occupies a position toward the front end of the slot 26 and the toggle links 13 and 14 are drawn forward and flexed to bring the pivots 15 and 16 into close relation to one another. The arms 11 and 12 will be thus drawn together or toward one another in consequence of which the bag grippers 6 and 7 will be spread apart to clear the spout and to afford sufficient space around the spout to enable the bag to be applied with facility thereto. Clamping and holding of the bag is effected by swinging the handle or lever 18 forwardly into the position shown in Figure 2. This movement of the handle forces the middle pivot 17 toward the rear end of the slot 26 and in so doing, it straightens the toggle links 13 and 14, thus spreading apart the pivots 15 and 16, and as this movement continues, the grippers 6 and 7 will be forced firmly against the mouth of the bag at opposite sides of the cylindrical portion 8 of the spout. The operating movement of the handle or lever 18 in this direction, continues until the middle pivot 17 has reached the end of the slot 26 at which time the toggle links 13 and 14 will have passed the dead center position, and the inward forces acting on the toggle links from the pivots 15 and 16, due to the reaction of the clamping bag on the spout by the grippers, will hold the middle pivot 17 at the rear end of the slot 26. The grippers will thus clamp and hold the bag on the spout without requiring the operator to maintain a hold on the handle 18. When it is desired to remove the bag, it is only necessary to swing the handle 18 back to the position shown in Figure 1, this operation flexing the toggle to first unlock it and to subsequently swing the grippers outwardly and away from the sides of the spout.

Bag holders constructed in accordance with the present invention may be employed advantageously in connection with bag-filling spouts or similar apparatus of the kind in which the mouths of the bags to be filled are placed around the outer peripheries thereof, the bag grippers, according to the present invention, moving relatively in a direction toward one another and toward the outer periphery of the spout to grip or clamp the mouth of the bag against the outer sides of the spout, although the grippers will swing away from the spout to a sufficient extent to enable the filled bags to be removed and the empty bags to be applied to the spout without interference. The bag applying and removing operations are especially facilitated by providing means which equidistantly spaces the bag grippers at opposite sides of the spout, as the entire periphery of the spout is then unobstructed. By attaching the bag holder to the spout or equivalent device or otherwise mounting the bag holder so that it is carried by or connected to the spout, the use of a separate support for the bag holder is rendered unnecessary and, moreover, maintenance of a correct operative relation between the spout or equivalent device and the bag holder is insured.

I claim as my invention:—

1. A bag holder for use in connection with a hollow filling member to exteriorly receive the mouth of a bag, comprising cooperative segmental oppositely-movable bag grippers, pivotal means connecting the grippers for moving them relatively toward one another in a plane transverse to the axis of said member to embrace and hold a bag against the outer periphery of said member, and a lever connected to and operative to shift the pivotal means in opposite directions to open and to close and lock said grippers.

2. A bag holder comprising cooperative oppositely-movable bag grippers, a self-locking toggle operative, when shifted to locked position, to move the grippers relatively in a direction toward one another to grip a bag, and a lever connected to and operative to shift the toggle into locked position to first move the grippers into bag gripping position and to then lock the grippers in such position.

3. The combination of a bag filling member providing an annular portion adapted to receive the mouth of the bag around it, a bag holder exteriorly applied to said member and comprising cooperative segmental grippers relatively movable toward one another in a plane transverse to the axis of said annular portion to grip the mouth of a bag against and around the outer side of said member, and means connected to the grippers and said member for moving the grippers relatively to one another and said member in said transverse plane and for locking the grippers against movement when in engagement with the mouth of a bag.

4. The combination of a spout disposed to receive the mouth of a bag around its periphery, cooperative coaxially pivoted grippers located outside of the spout and relatively movable at one side of their pivot toward the spout to grip and hold a bag, said grippers having extensions at the opposite side of their pivot and movable devices connected thereto and provided with means for shifting the same.

5. The combination of a spout disposed to receive a bag around its outer periphery, cooperative grippers having pivot connections to the spout and to one another and operative in a plane transverse to the axis of the spout to grip a bag against the outer side of the spout, pivoted lever means connecting portions of the grippers for operatively and relatively moving them, and a lever connected to said pivoted lever means and mounted to swing in a plane transverse to the axis of the spout and to shift the pivoted lever means in opposite directions.

6. The combination of a spout adapted to receive a bag around its outer periphery, cooperative grippers carried by the spout and relatively movable toward the latter to grip a bag against the outer side thereof, pivoted means connecting the grippers and operative to relatively move them, and an intermediately fulcrumed lever having a free extremity engaging a portion of the pivoted means to shift the latter longitudinally in opposite directions and relatively move the grippers.

7. The combination of a spout, cooperative grippers pivotally supported by the spout and relatively movable in a plane transverse to the axis of the spout to grip a bag against the outer side of the spout, a toggle lever having members pivoted to the grippers and also having a pivot connecting them, and operating means engaging the pivot connecting the members of the toggle lever to shift the latter longitudinally in opposite directions and for locking the said toggle members against movement and holding the grippers in bag-gripping position.

8. The combination of a spout having a bracket projecting therefrom, cooperative oppositely movable grippers, a toggle lever having members pivotally connected to portions of the grippers and also pivoted to one another, the pivot of the toggle members engaging the bracket, and an operating lever having a portion thereof engaging the pivot of the toggle lever members and also fulcrumed to the bracket.

9. The combination of a spout having a slotted projecting device secured thereto, cooperative oppositely movable grippers pivotally connected to said projecting device, a toggle having members pivotally connected to the grippers and also having a pivot connecting them and operative to relatively move the grippers toward one another in a plane transverse to the axis of the spout to grip a bag against the outer periphery of the spout, and means also movable in a plane transverse to the axis of the spout supported by said devices and having a portion thereof engaging the pivot connecting the toggle members, the pivot of the toggle members being movable in the slot of said device.

10. The combination of a spout, cooperative relatively-movable grippers at opposite sides thereof, means for concurrently moving the grippers toward and from the opposite outer sides of the spout to grip and release a bag, and means connected to the spout and cooperative with the means first mentioned for equidistantly spacing the grippers at opposite sides of the spout during the relative movements of the grippers.

11. The combination of a spout, cooperative relatively movable grippers arranged at opposite sides of the spout, a toggle connecting the grippers and operative to relatively move the grippers toward and from the spout to grip and release a bag, and a guide cooperative with the toggle to maintain equidistant spacing of the grippers relatively to the spout.

12. A bag holder for a bag-filling device comprising a bracket adapted to be attached to said device, a pair of cooperative relatively movable bag grippers pivotally connected to said bracket, a toggle connecting the grippers and operative, when straightened, to force the grippers toward one another to perform a bag-gripping operation, and guiding means on said bracket and cooperative with the toggle to maintain equidistant spacing of the grippers relatively to a common center.

In testimony whereof I have hereunto set my hand in presence of two subscribing witnesses.

THOMAS P. HILTON.

Witnesses:
R. O. PORIS,
J. P. CLIFFORD.